United States Patent
Skaife

(10) Patent No.: US 6,405,482 B1
(45) Date of Patent: Jun. 18, 2002

(54) PLANT GROWING SYSTEM AND METHOD OF USING SAME

(75) Inventor: William A. Skaife, Vista, CA (US)

(73) Assignee: The Vivian A. Skaife Trust, San Marcos, CA (US)

( * ) Notice: Subject to any disclaimer, the term of this patent is extended or adjusted under 35 U.S.C. 154(b) by 0 days.

(21) Appl. No.: 09/345,015

(22) Filed: Jul. 2, 1999

(51) Int. Cl.[7] .............................................. A01G 25/00
(52) U.S. Cl. ......................................................... 47/79
(58) Field of Search ............................... 47/79, 81, 83, 47/60, 65.5, 82, 59

(56) References Cited

U.S. PATENT DOCUMENTS

| | | | |
|---|---|---|---|
| 2,854,790 A | * 10/1958 | Hartung | 47/79 |
| 3,961,444 A | 6/1976 | Skaife | |
| 4,100,699 A | 7/1978 | Skaife | |
| 4,117,685 A | 10/1978 | Skaife | |
| 4,213,274 A | 7/1980 | Skaife | |
| 4,397,114 A | 8/1983 | Skaife | |
| 4,528,774 A | 7/1985 | Skaife | |
| 4,991,345 A | * 2/1991 | Bloch | 47/79 |
| 5,007,135 A | * 4/1991 | Rigsby | 47/73 |
| 5,136,806 A | * 8/1992 | Kang | 47/81 |
| 5,622,004 A | * 4/1997 | Gidge | 47/71 |
| 6,138,411 A | * 10/2000 | Lin | 47/81 |

* cited by examiner

Primary Examiner—Peter M. Poon
Assistant Examiner—Judith Nelson
(74) Attorney, Agent, or Firm—McKee, Voorhees & Sease, P.L.C.

(57) ABSTRACT

A growing system includes an outer pot of net material and an inner pot holding water and nutrients fed through a tube extending to the top of the outer pot. Peat growing medium is provided in both pots including the space between the inner and outer pots. An outer watering saucer may be provided for plant growth in a first warm climate while a stabilizing pot may be used in a second climate for securing the outer pot to a substrate of ground soil. The plant roots grow into both the inner and outer pots and through the bottom wall of the outer pot into the ground soil. Additional plants may be positioned to grow through the side openings in the outer pot. The heat growing medium may be dehydrated to 15% of its normal moisture for transport between the first climate to a second climate with hydration occurring at the second climate.

20 Claims, 5 Drawing Sheets

PLANT GROWING SYSTEM AND METHOD OF USING SAME

BACKGROUND OF THE INVENTION

Cool weather and the cost of indoor growing of plants limits the availability of high quality food produce in many parts of the country for a very large part of each year. Typically, the produce will be grown in a warm climate, harvested in an unripe or green condition ad then shipped to consumers throughout the country. The quality of the produce suffers from these less than ideal growing conditions.

Prior to the spring and summer time periods in the cool regions, plants may be started in a greenhouse and then transplanted by the consumer. Again, the cost is too great for full growth to occur in the artificial climate.

A further need for an improved growing system is to provide plants with the smallest amount of growing medium, ultimate nutrients and with access to a larger growing medium to counter adverse extreme effects of salt build up. The highest quality including the best tasting food produce comes from plants grown under these conditions.

SUMMARY OF THE INVENTION

A water and nutrient first pot is placed inside a larger second pot having perforated side and bottom walls. Both pots are filled with a porous root medium made of a fine grade of peat soil and perlite such as that sold as Hasselfors peat. A two inch diameter plastic pipe slightly taller than the outer net pot is used to fill the inside pot with fertilized water. An outer watering saucer is provided in which the outer net pot is placed during the initial period of growing the crop in a warm first climate. The inner first pot may be glued to the inside bottom of the net pot with equal spacing there around as to the sides of the net pot. The assembled first and second inner and outer pots can initially rest in a common watering system or in the outer watering saucer.

Because of the holes in the net pot and because of the porous root medium, 16 lbs. of air pressure penetrates the entire mass of medium and the invention may be in continuous contact with water. With the unrestricted air penetration and water distributing itself throughout the root medium utilizing the small pore spaces and capillary action; the root medium serves as a carburetor mixing the air and water, creating 100% humidity (vapor) in the large pore spaces of the root medium. The roots of all plants grow and function in the humidified air spaces absorbing the water from the small pore spaces, as needed, by the plant.

Adding a fertilizer with all the major and minor elements to the water, the carburetor now provides the roots functioning in the humidified air spaces with the plant's needs as to fertilizer as well as water. This process is called cafeteria feeding by the roots.

Like tiny rivers, the small pore spaces in the root medium move the fertilized water by capillary action from the water source throughout the root medium. The feeder hair roots growing in the larger pore spaces, like fishermen, "catch" what they need to supply the plant its needs as to water and fertilizer, at all times, without any human discretion or control. The carburetor provides the optional and optimum needs of water and fertilizer for all plants.

Resting in the fertilized water contained in a common watering system or individual outside saucer, the root medium between the inside saucer and inside wall of the net pot absorbs and moves the fertilized water from the water source throughout the root medium by capillary action. It is not necessary that the inside sauder be filled with fertilized water so long as the net pot rests in a water source or has access to another water source such as a drip line.

At any time during the crop's growth, the system, without using the outer saucer, may be placed on top of field or garden soil; a container holding soil or soil mix; or another substrata. From this time on, fertilized water is added through the fill pipe, to the inside saucer which may be maintained full at all times.

The roots that have grown in the root medium between the inside saucer and the inside of the net pot will automatically grow into the substrata upon which the transition transplanting system is resting.

An automatic transition is made by the roots from a "man-made," "hydroponic" system into a natural soil or other man-made/hydroponic system automatically without any shock or interruption of growth and production.

A "catch 22" situation happens without the benefits of the system in transplanting up a carburetor system:
1) Because there is a minute amount of root medium in relationship to the size of the plants, the root medium must be kept in continuous contact with water. If the systems were planted conventionally (buried in the farmer's or home gardener's soil or a larger container), cutting off the air while keeping the root medium saturated would drown the roots severely shocking or killing the plant(s).
2) On the other hand, the cutting off the air by planting the systems into the farmer's or home gardener's soil and then attempting to monitor the amount of water and fertilizer needed minute by minute by the crops would require computer programming for each plant too complex to even be considered.

The "catch 22" situation is the roots must be transplanted up into additional soil or root medium into which they can grow and obtain the water and fertilizer needed to support exponential continued growth of the plant(s) while the carburetor feature of the system must be maintained.

The invention solves this dilemma. By placing the system on top of the farmer's or home gardener's soil or on a larger container of root medium, the air continues to reach the sides of the net pot. By keeping the inside saucer full of fertilized water, the root medium is maintained in a saturated condition at all times. The horticultural carburetor is maintained exactly as it functioned before transplanting up.

The roots growing between the inside sauder and inside wall of the net pot automatically penetrate the new moist substrata without any shock whatsoever to the crop, without any interruption of growth and harvest.

Because the crop, utilizing cafeteria feeding, can take from the horticultural carburetor exactly what it needs in water and each fertilizer element and the amount of each, as needed, at all times, without human judgment and control; the crop grows faster, is healthy and produces optimum yields.

Because the root medium between the inside saucer and inside wall of the net pot (circular legs) draw the fertilized water up when the system rests in a tray of water, all the plants for a backyard garden or thousands (no limit) of systems growing seedlings to mature crops can be grown together in common watering trays. Moved to their new location and spread-out where the roots make their "transition" into soil or other substrata; they are watered utilizing a common drip line providing the fertilized water for the inside saucers.

One person can water and fertilize a "a million" plants of varying varieties and sizes and never make a mistake in providing perfect watering and fertilizing conditions for optimum growth of each plant with its unique needs. The water/fertilizer person can be totally unskilled in horticulture yet he does a better job than a Ph.D. expert specializing in one crop, by doing nothing other than maintaining the fertilized water in contact with the root medium in the systems at all times.

In conventional watering and fertilizing of crops, because the soil or root medium is not in continuous contact with fertilized water; there must be enough mass of soil or root medium to store water and fertilizer between periodic applications of each. Because the root medium can be in continuous contact with fertilized water, there is no need for a volume mass of root medium used for the storage of water and fertilizer. Growing in the invention, the foliage and fruits of the crops reach a significantly, disproportionate, actually a "Gulliver size" in relationship to the size and volume of the root medium. Following are some of the commercial benefits of this capability of the invention called the micro chip of agriculture."

1. Savings in the cost of raw materials used in making the systems: obviously if a net pot and root medium a fifth, or smaller in size, to a conventional container can grow a crop of the same size and productivity; this represents a significant savings in raw materials.
2. Heating of the root environment: Cool-weather crops, i.e., peas, cabbage, broccoli, lettuce need minimum soil temperatures of 35° to 50° for the roots to function properly. Warm-weather crops, i.e., tomatoes, peppers, melons, beans must have soil temperatures at a minimum of 70° for their roots to absorb fertilizer. It is obvious that by using the "micro chip" feature of the invention, significantly miniaturizing the amount of root medium needed to grow crops, less energy is needed to heat the lesser amount of root medium.
3. Portability: Tomatoes, peppers, melons, beans, eggplant, in the full harvest of ripe fruit and vegetables, growing in the transition transplanting system which is no larger than a small waste basket; can be moved economically as to freight expenses from one location to another, without shock or interruption of growth. This concept of portability of mature crops utilizing the "micro chip" feature of the invention is known as "crop migration."

Crops growing in the invention are grown outdoors in a climate that is ideal for the crop at that time of year, i.e., south Florida in November through May; southern California, next to the Pacific, May through October. With nine or more 6' tomato plants growing on 7' stakes in a system holding only 20 quarts of root medium; a half acre, 20,000 sq. ft. of plants in full production are moved in a 350 sq. ft. semi from the first climate into the second climate hundreds or thousands of miles away.

The 7' stakes are tired together at the top in what is called the "closed accordion" for transit. Upon arrival, the stakes are reopened to a 4' square, "open accordion," creating an immediate half acre of crops in full production.

Full mature individual containers of crops may be shipped economically and conveniently by air, UPS or the Post Office to the consumer. The consumer can transport home from a retail outlet a system growing hundreds of tomato sets (some ripe) in a cardboard box measuring 12" square and 4' long in the back seat of a car.

Because of salt build-up in the 20 quart system growing the mature plants, in harvest, and the exponential growth of the crops entering the second climate, the system soon cannot meet the roots' needs in supporting the plants with the "carburetor/cafeteria feeding" feature. The plants must be supported by a larger mass of root environment, such as ground soil, to continue their potential growth and productivity.

There is a direct relationship between salt build-up in the substrata in which crops are grown and flavor. The higher the salts, the better the flavor. However, with an over supply of salt in the root medium, the osmosis process by roots of absorbing water cannot continue. Carried to extremes the tomatoes, peppers, peas, etc., become indescribably flavorful . . . just prior to the death of the plant.

The invention enables the plant to benefit from a high salt build-up and improving flavor as a result of growing in a system and at the same time providing an unsalted environment supporting continued growth in a secondary system or natural substrata.

The plants growing in the invention have what may be called a "Siamese root system." With continuous unmonitored fertilization, "cafeteria feeding," the root medium in the first root system builds up in salt, improving flavor. The second root system grows the system into the farmer's or gardener's natural soil or another system. This new root environment is salt free, providing the second roots with unrestricted capabilities to absorb water and fertilizer while the first root system utilizes the salt build-up for flavor enhancement.

The root environment in the first system can be pumped higher and higher in salts when watered from the inside saucer, ever increasing flavor, while the second root system receives an alternate water/fertilizer source. The lesser fertilization in a "pure" environment meets the plant's water and balanced fertilizer needs.

Another commercial feature of the transition transplanting system is the growing of plant material from the holes in the side of the net pot. The indispensable purpose for the "holey" pot is to allow natural air pressure to force fresh air into the medium at all levels. As long as the net pot is not placed in an outside container, these holes can be planted with leafy and other crops. This is free production, so to speak, and reduces the evaporation process while providing the production of additional crops.

Growing a diversity of plants for the root medium in the sides of the system points out another feature of the invention. It is a spin-off of the cafeteria feeding principle already discussed. Because all possible fertilizer elements are available to all possible plants as needed; as well as their water needs, on call; any assortment of plants can be grown together in the system. Combining combinations of tall growing plants like tomatoes, eggplant, cucumbers, growing from the top with shorter growing plants like lettuce, spinach and herbs, even cabbage, cauliflower, kale and chard from the side; much greater production can be obtained from each system. The leafy and cold crops just mentioned will also tolerate shade and colder soil conditions. It is possible to start the cold crops in lesser outdoor temperatures and then transition transplant warm crops like tomatoes, peppers, melons into the same System in which the cold crops are growing. In the fall it is also possible to remove the warm crops after a frost and continue to grow on the cold crops.

Because the horticultural carburetor and cafeteria feeding can support infinitely more foliage and fruit than crops grown utilizing periodic watering and fertilization; another principle may be utilized, referred to as "multiple first cluster production." First, some background on how crops multiply their fruit and vegetable production as they grow.

Nomenclature:

Primary Stem: Undamaged, the tomato plant will have one stem which "leads" the continued growth of the plant. If lost, the primary stem will generally be taken over by the top lateral stem.

Leaf Stem: Periodically, as the primary stem grows, a leaf stem grows from it. This leaf stem will grow larger producing many leaves as the plant grows, depending upon sunlight and other growing factors.

Flower Cluster: Again, periodically, as the primary stem grows, it sets clusters of flowers which when pollinated and under suitable growing conditions become tomatoes.

Lateral Stem: A lateral stem grow from the primary stem at the point where a leaf stem grows. These are called "suckers." These sucker/lateral limbs, if left to grow on the plant, will function the same as the primary stem. The lateral stem will set its own leaf stems and flower clusters. After several months of growth, the production for the primary stem and lateral stems of a single tomato plant are incalculable.

By planting 9 plants vs. a single plant, this multiplication factor becomes squared×9. The production of one plant is reduced by 9; saying it another way, in the same period of time, the 9-plant system produces 9 times the fruit sets of the single plant.

The "magic" of the system is that when the plants are staked, providing sunshine for each plant, and appropriate transition transplanting is maintained, the microchip carburetor will support the 9 plants for optimum growth and fruit sets as though each were planted in an individual container or in the soil. What is happening is that each of 9 root systems is utilizing, almost immediately, its 11% of the root medium assigned to it. The minute amount of root medium for each root system is adequate to support "Gulliver's growth."

One root system in the container must grow for a period of time to each the extremities of and utilize all of the root medium. In "multiple first cluster production" "all the seats in the plane are filled on every flight."

For an understanding of the process and benefits of the multiple plant/volume first cluster production concept they will be discussed step by step.

Fifteen tomato seeds are planted in the root medium around the top perimeter of a 190 mm net pot or system. This net pot holds exactly 12 cups of root medium. At the same time 9, 3' bamboo stakes are inserted into the root medium around the perimeter at an angle so the circle they outline at the top is about two feet in diameter. The planted net pot or system is placed in 1–2 inches of fertilized water.

After the seeds germinate, the planting is thinned to the strongest 9 seedlings equally spaced as possible around the top of the net pot or system.

As the seedlings grow long enough, one seedling is tied to each 3' stake which is continued until the plants reach the top of the 3' stake.

Beyond conventional horticultural comprehension, the 9 tomato plants growing in the 12 cups of root medium grow as well as if each were planted in one conventional pot of the same size utilizing conventional potting soil and human discretion as to watering and fertilization.

What is provided are 9 individual tomato plants growing and setting flowers in one container a fraction of the size that it would take to grow them in conventional containers.

As long as the net pots or systems are transition transplanted up so as to support the 9 root system and the vines are trellised out into continuous sunshine; these 9 plants will continue to this exponential production.

Because of the minute amount of root medium in relationship to plant material and fruit, the plants and system must be stabilized at the time of transition transplanting. This can be done with stakes and/or the transition transplanting stabilizing "pot."

The "pot" is a conventional tapered container slightly larger than the net pot or system it will hold. The pot does not have a solid bottom, only a bottom rim which keeps the net pot from protruding from the bottom. The outside of the pot extends slightly beyond the rim, or expressing it another way, the rim is slightly inside the sidewall of the pot. This side-wall of the pot rests on the ground creating an "air tight" rim between the bottom of the net pot or system resting on the rim of the stabilizing pot.

Because of the irrigation process taking place in the net pot or system and soil into which the roots are growing, the air space encased within the side-wall of the pot will generally be 100% humidified. The roots in the net pot or system will grow as humidity roots through this air space and into the soil converting into soil roots upon entering it. The humidified space between the net pot and soil becomes an invisible bridge through which the roots will grow.

A substantially wide flat annular flange piece in relationship to the size of the net pot is molded around the bottom of the stabilizing pot with holes in each of four corners.

The stabilizing pot is placed on top of the natural soil or soil in a larger container. The spikes are driven into the new root medium. The appropriate net pot or system is then placed into the stabilizing pot, stabilizing the net pot and plants. A the roots grow into the substrata they will further stabilize the plants.

Utilizing the "side-show" configuration of the net pot or system, the stabilizing pot is only high enough, i.e., ¼ to ⅓ the height of the net pot to hold the net pot securely. There is no gap between the net pot and stabilizing pot. Holding the net pot upright, utilizing only the bottom portion of the net pot, the top ⅔ or ¾ portion can be used to grow "side-show" crops.

The cost of transporting plants from the first climate to the second climate is significantly reduced fusing the growing system of this invention in that it allows dehydrating the growing medium to approximately 15% of the moisture of the normal growing medium. This involves simply drying the environment in which the roots of a finished plant are growing to a fraction of its normal weight. This can be done with the root balls of any size plant growing in the environment. The Hasselfors peat has practically no weight. The peat in a six-inch pot weighs only a few ounces. Unlike soil, almost every drop of water in the medium is available for use by the roots. This means that if there are six or eight ounces of water in the medium, practically all of it is usable. In contrast, only six or eight ounces of water in most solid would be trapped and unusable by the roots.

By testing the effects on different plants, it can be determined how dehydrated the root ball can become before there is any damage. Six-inch potted foliage plants 18" to 36" in size can be shipped at a reduced combined weight for plant and medium to about one pound. Upon arrival the medium is placed in one inch of water. It will soak up two to three pounds of water in a few minutes becoming the perfect environment again with no damage to the plant. Freight on two or three pounds of unneeded water at 25¢ to $1.00 a pound has been saved.

DESCRIPTION OF THE PREFERRED INVENTION

Figure 1:
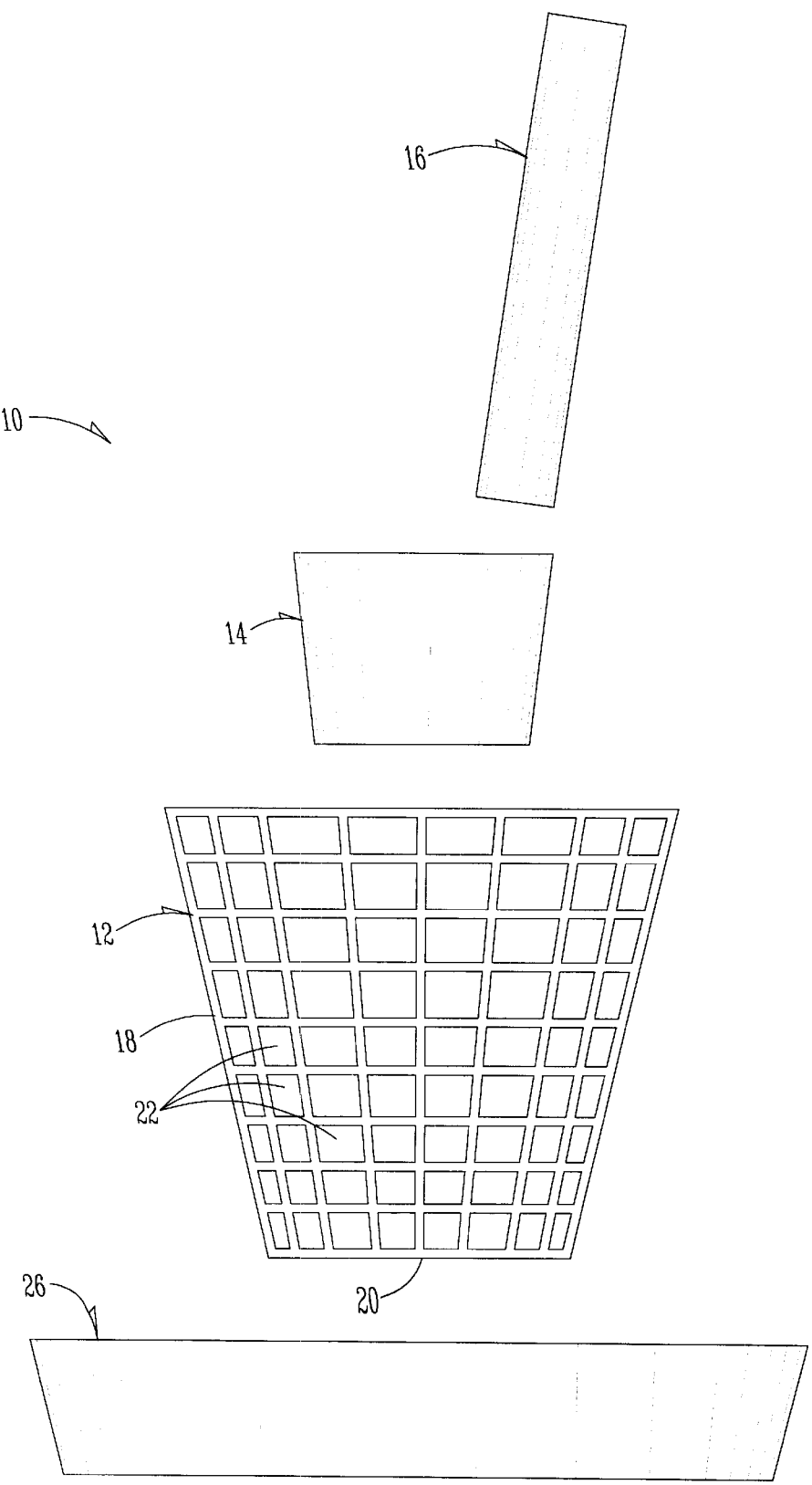
FIG. 1 is an exploded side elevational view of the component parts used in the growing system of this invention.
Figure 2:
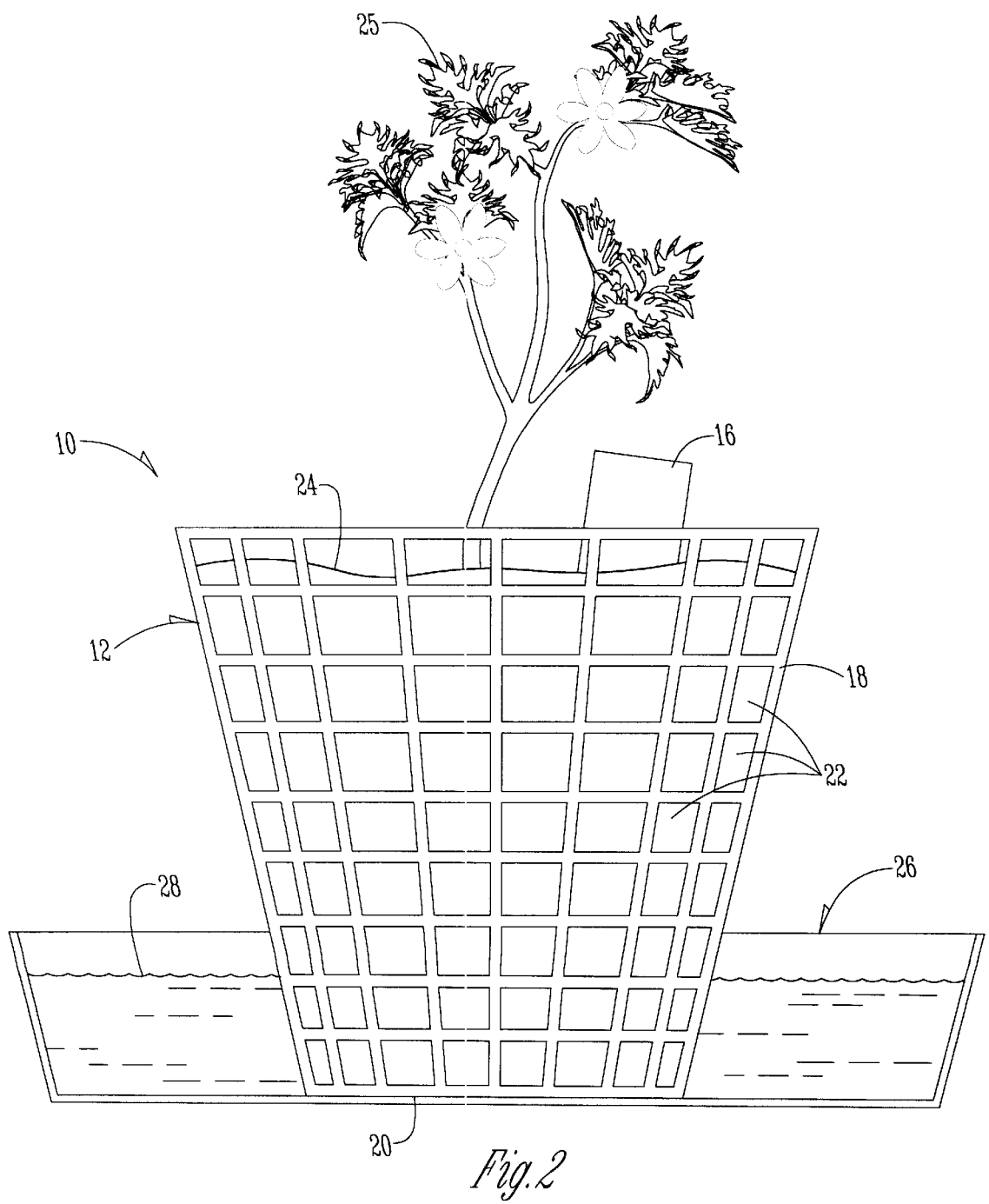
FIG. 2 is a view similar to FIG. 1 but showing the component parts assembled and in use with a growing plant.

The plant growing system is referred to generally in FIG. 1 by the reference numeral 10 and includes an outer pot 12 of net material in which an inner smaller water and fertilizer holding pot 14 is positioned to receive a feed tube 16.

The outer pot 12 made of net material provides a sidewall 18 and a bottom wall 20. Openings 22 are provided for multiple purposes including aeration of growing medium 24 in pots 12 and 14.

When the plant 25 is being grown in a warm first climate it may be positioned in a watering pot 26 containing water 28.

Figure 3:
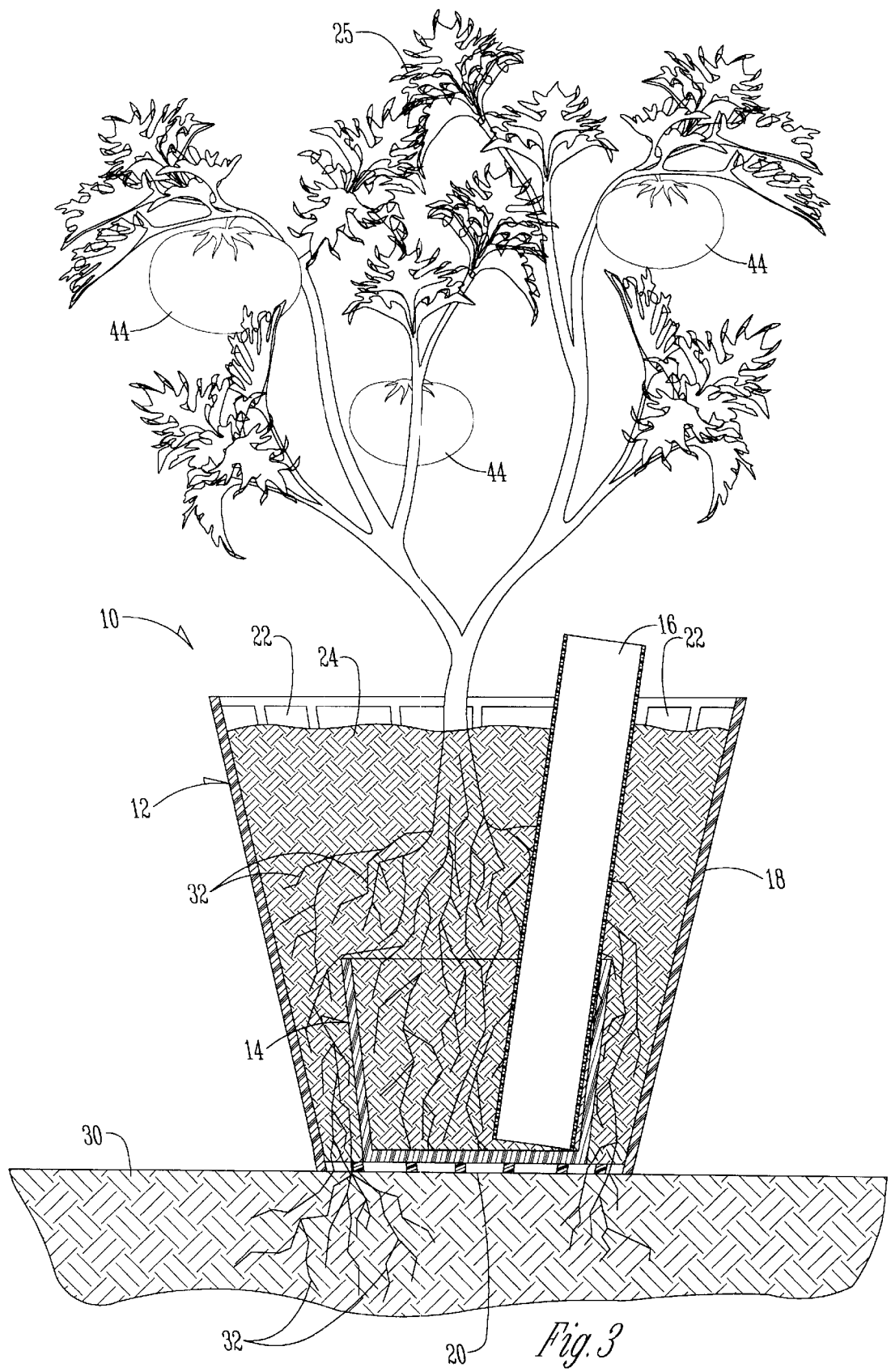
FIG. 3 is a vertical cross-sectional view showing a plant fully grown with its root system feeding on nutrients in the inner pot, outer pot and exterior substrata ground soil.

When the plant 25 is later moved to its second climate it may be placed outside on the ground soil 30 allowing the plant roots 32 to grow downwardly between the sidewalls of the inner and outer pots 14 and 12 and through the bottom perforated wall 20 of the outer pot into the ground soil 30 as seen in FIG. 3.

Figure 4:
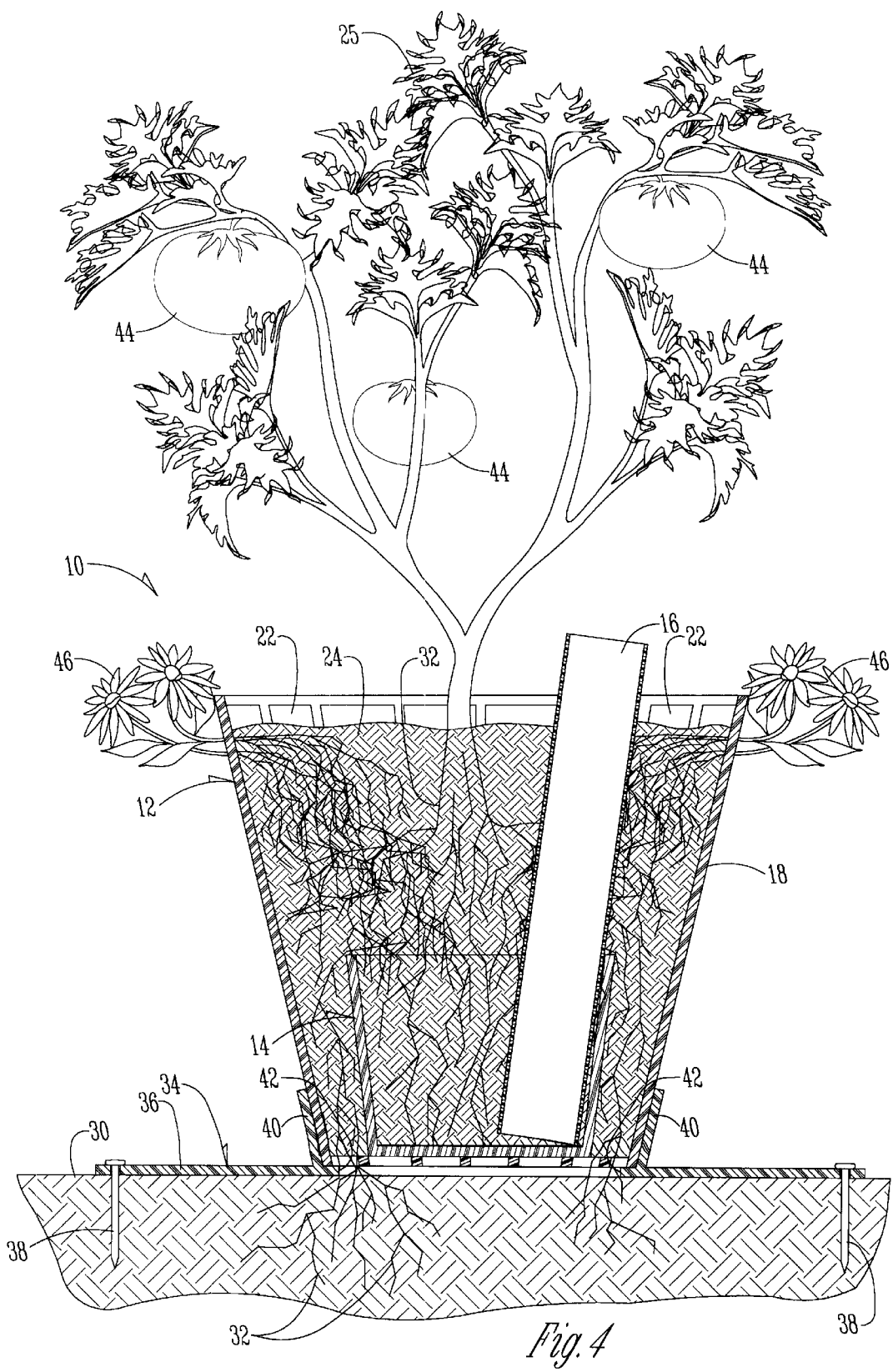
FIG. 4 is a view similar to FIG. 3 but showing plants growing through the sidewall of the outer net pot and a stabilizing pot for securely holding the outer net pot in place on ground soil.

As seen in FIG. 4, a stabilizing pot 34 is provided for securing the outer pot 12 on the ground 30 and includes a laterally outwardly extending flange 36 for receiving ground fasteners 38. An upwardly extending wall 40 is shaped to complement the exterior surface of the outer wall 18 of the pot 12 as seen in FIG. 4. An inwardly extending annular wall portion 42 is provided on which the bottom end of the outer wall 18 rests.

As further seen in FIG. 4, the plant 25 has grown tomatoes 44 and other plants 46 grow from the growing medium 24 through the side wall openings 22 of the outer pot 12 outer wall 18.

The water and fertilizer tube 16 allow for the roots 32 in the inner small pot 14 to be fed a controlled mixture of water and nutrients in the most efficient manner possible since the water and fertilizer is concentrated in a small volume of porous growing medium. The plant roots can pick and choose in cafeteria fashion the ultimate combination of water, air and nutrients to give the fastest growing and highest quality produce.

Figure 5:
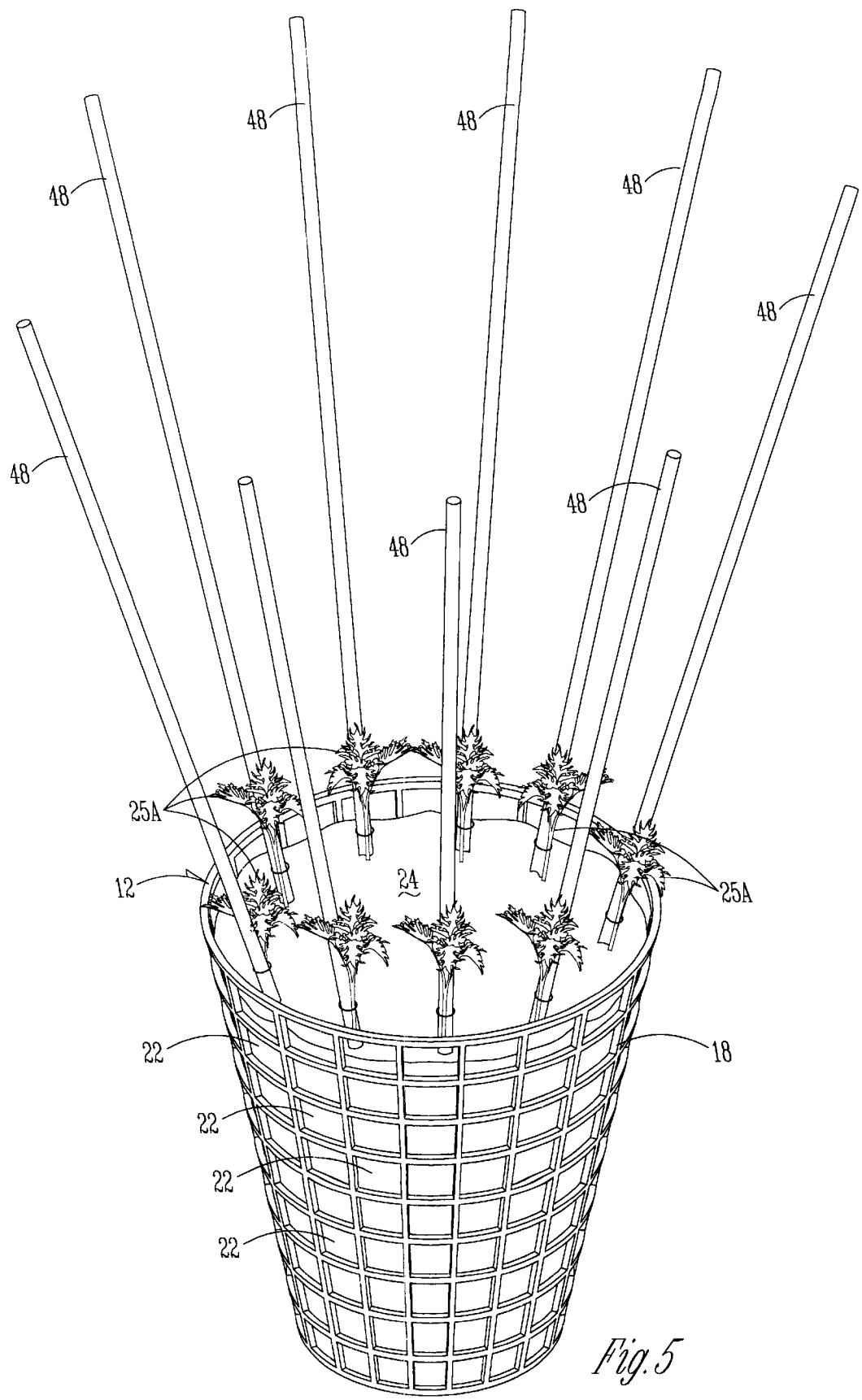
FIG. 5 is a perspective view of a pot being staked around its periphery for nine plants.

In FIG. 5, nine stakes 48 are arranged around the periphery of the outer pot 12 in the growing medium 24 and support small plants 25A for growth along the stakes having a length of approximately three feet. It is only through utilization of a growing system as described that it is possible to support this much plant growth in such a small area with so little growing medium. The cafeteria/carburetor feeding make this possible.

What is claimed is:

1. A plant growing system comprising,
    an inner smaller pot positioned in an outer larger pot with each pot having a sidewall spaced from the sidewall of the other pot,
    growing medium in the inner and outer pots and between the sidewalls of said inner and outer pots,
    said outer pot having a bottom wall including openings through which plant roots may grow and moisture may be transmitted to said growing medium, and
    said inner pot having an imperforate bottom wall whereby a water supply may be maintained in said inner pot with plant roots growing in said inner and outer pots and through said openings in said outer pot bottom wall.

2. The plant growing system of claim 1 having a watering means, which extends from said inner pot to the outside of said outer pot for providing water and/or nutrients to said growing medium and plants roots.

3. The plant growing system of claim 1 wherein said inner pot sidewall has a height substantially less than the height of said outer pot to allow plant roots to extend over said inner pot sidewall into the space between the sidewalls of the inner and outer pots.

4. The plant growing system of claim 1 wherein said outer pot is positioned in a watering pot for providing moisture to said growing medium through the openings in the bottom wall of the outer pot.

5. The plant growing system of claim 1 wherein said outer pot is positioned on a substrata growing medium for plant roots to extend into from said outer pot through the openings in the bottom wall of said outer pot.

6. The plant growing system of claim 5 wherein said substrata growing medium is ground soil.

7. The plant growing system of claim 6 and a watering means extends from said inner pot to the outside of said outer pot for providing water and/or nutrients to said growing medium and plant roots.

8. The plant growing system of claim 1 wherein said growing medium is a find grade of peat soil and perlite.

9. The plant growing system of claim 1 wherein said inner pot is ½ to 1 inch smaller in diameter than the bottom diameter of the outer pot.

10. The plant growing system of claim 1 wherein said outer pot is made of plastic net material.

11. The plant growing system of claim 10 wherein said net material includes holes thereby providing holes in the sidewall of the outer pot.

12. The plant growing system of claim 10 wherein plants are positioned in said holes in the sidewall of the outer pot.

13. The plant growing system of claim 1 wherein said outer pot is positioned in a stabilizing pot having an open bottom and a sidewall having a laterally inwardly extending rim for supporting said outer pot.

14. The plant growing system of claim 13 wherein said stabilizing pot and outer pot when positioned on a support surface form a substantially air tight chamber between said outer pot and said stabilizing pot thereby providing humidified air in said chamber for plant roots in the growing medium in the outer pot.

15. The plant growing system of claim 13 and laterally outwardly extending portions are provided at the bottom of said stabilizing pot to be engaged by stakes to secure said stabilizing pot on the ground.

16. The plant growing system of claim 15 wherein said stabilizing pot is ¼ to ⅓ the height of the outer pot for holding said outer pot securely.

17. The plant growing system of claim 16 and the sidewall of said outer pot includes openings in which plants grow from the growing medium above said stabilizing pot.

18. A plant growing system comprising,
    an inner smaller pot positioned in an outer larger pot with each pot having a sidewall spaced from the sidewall of the other pot,
    growing medium in the inner and outer pots and between the sidewalls of said inner and outer pots,
    said outer pot having a bottom wall including openings through which plant roots may grow and moisture may be transmitted to said growing medium, said outer pot being positioned in a stabilizing pot having an open bottom and a sidewall having a laterally inwardly extending rim for supporting said outer pot, and laterally outwardly extending portions being provided at the bottom of said stabilizing pot to be engaged by stakes to secure said stabilizing pot on the ground.

19. The plant growing system of claim 18 wherein said stabilizing pot is ¼ to ⅓ the height of the outer pot for holding said outer pot securely.

20. The plant growing system of claim 19 wherein the sidewall of said outer pot includes openings in which plants grow from the growing medium above said stabilizing pot.

* * * * *